E. A. KAUFFMAN.
PLIERS.
APPLICATION FILED SEPT. 23, 1920.
1,424,915.
Patented Aug. 8, 1922.
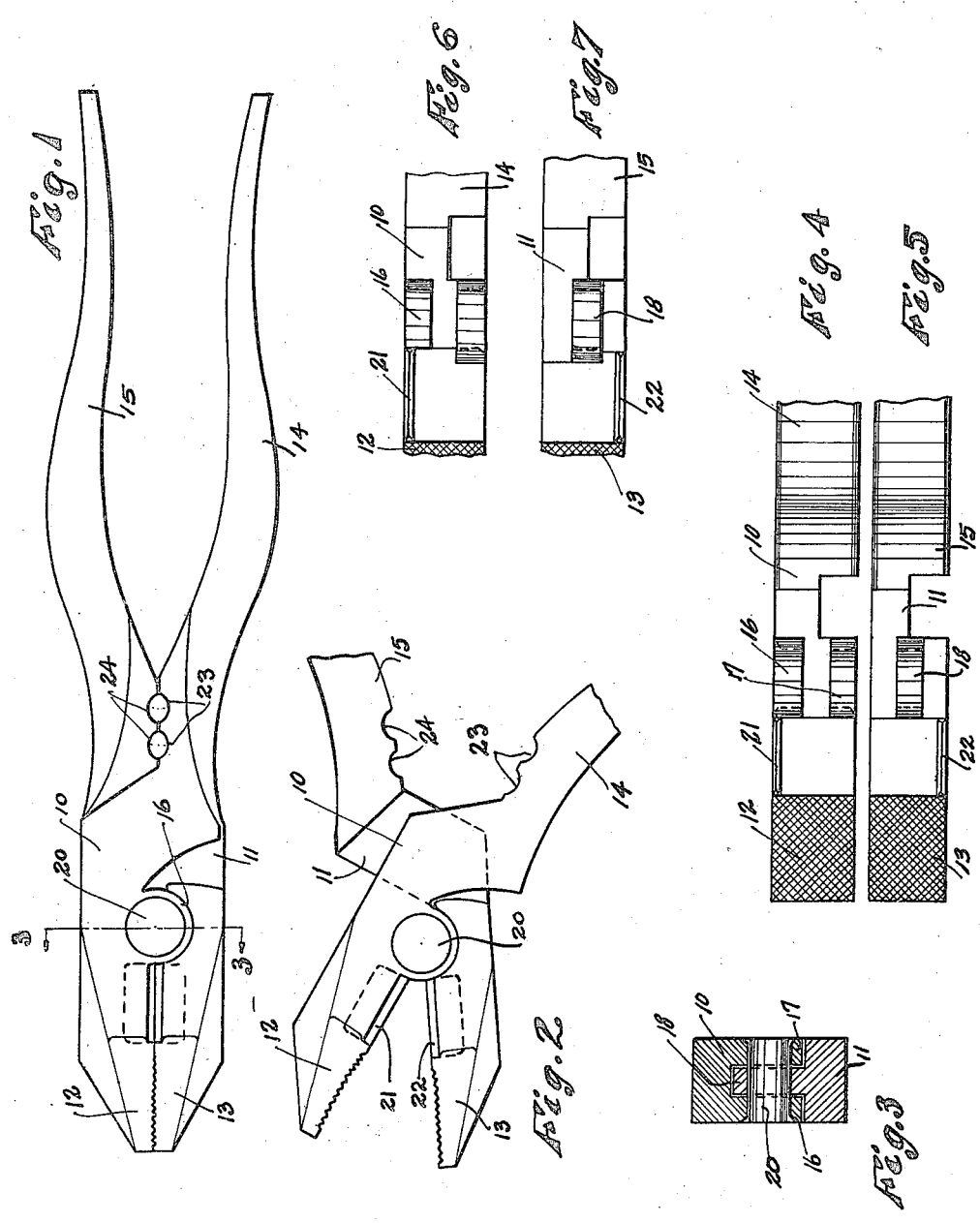

UNITED STATES PATENT OFFICE.

ELIAS AUGUST KAUFFMAN, OF CHICAGO, ILLINOIS, ASSIGNOR TO K. T. MANUFACTURING COMPANY, OF CHICAGO, ILLINOIS, A CORPORATION OF ILLINOIS.

PLIERS.

1,424,915.

Specification of Letters Patent.    Patented Aug. 8, 1922.

Application filed September 23, 1920. Serial No. 412,235.

*To all whom it may concern:*

Be it known that I, ELIAS AUGUST KAUFFMAN, a former subject of the Emperor of Germany, who have declared my intention of becoming a citizen of the United States, and a resident of the city of Chicago, county of Cook, and State of Illinois, have invented certain new and useful Improvements in Pliers, of which the following is a specification.

My invention relates to improvements in pliers, and has for its principal object the provision of a new and improved arrangement of parts by which the leverage of the handles for cutting purposes is increased to a maximum, and by which a very strong and durable construction is attained. Other objects will appear hereinafter.

The invention consists in the combinations and arrangements of parts hereinafter described and claimed.

The invention will be best understood by reference to the accompanying drawings forming a part of this specification, and in which, Figure 1 is a side view of my improved pliers;

Fig. 2, a view similar to Fig. 1, partly broken away and showing the parts in a changed position;

Fig. 3, a vertical cross-section of the jaw members of the pliers on the line 3—3, Fig. 1;

Figs. 4 and 5, inner face views of the jaw members of the pliers; and

Figs. 6 and 7 are views similar to Figs. 4 and 5, but showing a modified form of structure.

Referring to Figs. 1 to 5, inclusive, 10 and 11 indicate the jaw members of my improved pliers, being provided with jaws 12 and 13, respectively, and handles 14 and 15, respectively. As is best shown in Fig. 4, the jaw member 10 is provided with oppositely disposed spaced ears 16 and 17 on its inner face, while the jaw member 11 is provided with a centrally disposed ear 18 which has a snug fit between the ears 16 and 17. A pivot pin 20 passes through the openings in the ears 16, 17 and 18, as is clearly shown in Fig. 3, for holding the jaw members in movable position with respect to each other. Oppositely disposed cutting blades 21 and 22 are provided upon the inner faces of the jaws 12 and 13, as is best shown in Fig. 2, such blades extending toward the pivot pin 20 and into close proximity thereto, the metal between the blades 21 and 22 and the pivot pin 20 being cut down to a very small thickness so as to permit the extension of the cutting blades to a point in close proximity to the axis of the pivotal connection between members 10 and 11. As will be readily understood, upon the insertion of a wire or similar part between the cutting blades 21 and 22, an operator is enabled to exert a very great pressure upon such part by reason of the great leverage which is provided by the extension of the blades into close proximity to the pivot pin 20.

Oppositely disposed grooves 23 and 24 are provided in the inner faces of the handle members 14 and 15, as is clearly shown in Figs. 1 and 2, providing means for grasping a wire or similar part loosely for bending the wire or for making a splice of the wire, as is very often required.

Referring now to Figs. 6 and 7, which show a modified form, it will be seen that the ear 16 is cut away at the side adjacent to the cutting blade 21, so as to provide for an extension of the blade 21 into contact with the pivot pin 20. In like manner, the cutting blade 22 is lengthened so as to stand opposite the cutting blade 21 throughout the full length thereof. By this arrangement, the cutting blades 21 and 22 are extended to as close a point as is possible with respect to the axis of the pivot pin. As will be readily understood, by the use of a small pivot pin, the point to which the blades 21 and 22 extend can be brought very close to the axis of the pivotal connection, thus increasing very greatly the effectiveness of the pliers for cutting purposes.

While I have illustrated and described the preferred form of construction for carrying my invention into effect, this is capable of variation and modification without departing from the spirit of the invention. I therefore do not wish to be limited to the precise details of construction set forth, but desire to avail myself of such variations and modifications as come within the scope of the appended claims.

Having described my invention, what I claim as new and desire to secure by Letters Patent is:—

1. A pair of pliers comprising two jaw members, two oppositely disposed ears in spaced relation on one of said members, a centrally located ear on the other member, fitting snugly between the spaced ears of the first-named jaw member, a pivot pin passing through openings in said ears, and oppositely disposed cutting blades formed in said jaws by laterally cutting away the material from one side thereof to a point adjacent the opposite side, said blades extending into close proximity to said pivot pin, substantially as described.

2. A pair of pliers comprising two jaw members, ears formed on said members, a pivot pin passing through openings in said ears for pivotally connecting said jaw members together, and oppositely disposed cutting blades on said members extending toward said pivot pin, the metal being cut away from one of said ears between the cutting blade and the pivot pin, substantially as described.

3. A pair of pliers comprising two jaw members, a pivot pin for pivotally connecting said jaw members together, and oppositely disposed cutting blades on said members extending into contact with said pivot pin, the metal being cut away from said blades and said pivot pin to permit such extension, substantially as described.

4. A pair of pliers comprising two jaw members, two oppositely disposed ears in spaced relation on one of said members, a centrally located ear on the other member fitting snugly between the spaced ears of the first-named jaw member, a pivot pin passing through openings in said ears, and oppositely disposed cutting blades formed in said jaws by laterally cutting away the material from one side to a point adjacent the opposite side thereof, and cutting away the metal about said pivot to permit said blades to extend into contact therewith, substantially as described.

5. A pair of pliers comprising two jaw members, a pin pivotally connecting said jaw members together, oppositely disposed cutting blades formed in said jaws by laterally cutting away the material from one side to a point adjacent the opposite side thereof, and cutting away the metal about said pivot pin to permit said blades to extend into contact therewith, substantially as described.

In testimony whereof I have signed my name to this specification in the presence of two subscribing witnesses.

E. AUGUST KAUFFMAN.

Witnesses:
W. H. D. BUCK,
CLARENCE E. THREEDY.